United States Patent
Liu et al.

(10) Patent No.: US 11,033,856 B2
(45) Date of Patent: Jun. 15, 2021

(54) MULTI-STAGE MEMBRANE SYSTEMS WITH POLYMERIC AND MICROPOROUS ZEOLITIC INORGANIC MEMBRANES FOR GAS SEPARATIONS

(71) Applicant: UOP LLC, Des Plaines, IL (US)

(72) Inventors: Chunqing Liu, Arlington Heights, IL (US); Simon E. Albo, Evanston, IL (US); David W. Greer, Cary, IL (US); Xueliang Dong, Schaumburg, IL (US); Mark M. Davis, Highland Park, IL (US)

(73) Assignee: UOP LLC, Des Plaines, IL (US)

(*) Notice: Subject to any disclaimer, the term of this patent is extended or adjusted under 35 U.S.C. 154(b) by 250 days.

(21) Appl. No.: 16/009,126

(22) Filed: Jun. 14, 2018

(65) Prior Publication Data

US 2019/0381449 A1    Dec. 19, 2019

(51) Int. Cl.
| | | |
|---|---|---|
| *B01D 53/22* | (2006.01) | |
| *B01D 71/02* | (2006.01) | |
| *B01D 71/64* | (2006.01) | |
| *B01D 71/68* | (2006.01) | |

(52) U.S. Cl.
CPC ......... *B01D 53/228* (2013.01); *B01D 53/225* (2013.01); *B01D 71/028* (2013.01); *B01D 71/64* (2013.01); *B01D 71/68* (2013.01); *B01D 2221/04* (2013.01); *B01D 2257/304* (2013.01); *B01D 2257/504* (2013.01); *B01D 2325/02* (2013.01)

(58) Field of Classification Search
CPC ........ B01D 53/22; B01D 71/02; B01D 71/64; B01D 71/68
See application file for complete search history.

(56) References Cited

U.S. PATENT DOCUMENTS

| | | | | |
|---|---|---|---|---|
| 3,751,878 | A | * 8/1973 | Collins | ................ B01D 53/047 95/105 |
| 5,185,014 | A | 2/1993 | Prasad | |
| 10,047,310 | B2 | 8/2018 | Kim | |
| 2017/0283292 | A1* | 10/2017 | Kim | ...................... B01D 53/229 |

FOREIGN PATENT DOCUMENTS

| | | | |
|---|---|---|---|
| WO | 199719454 A1 | 5/1997 | |
| WO | WO-9719454 A1 * | 5/1997 | ............... G21F 9/02 |
| WO | 2007134094 A2 | 9/2007 | |

OTHER PUBLICATIONS

International Search Report for PCT/US2019/037335 dated Sep. 12, 2019.

* cited by examiner

*Primary Examiner* — Youngsul Jeong
(74) *Attorney, Agent, or Firm* — Paschall & Associates, LLC; Mark Goldberg (57) ABSTRACT

A multistage membrane system and a process for treating a gas stream is provided in which the multistage membrane system comprises at least two membrane units wherein a first stage membrane unit comprises a polymeric membrane and a second membrane unit comprises a microporous zeolitic inorganic membrane or a combination of a microporous zeolitic inorganic membrane and a polymeric membrane.

12 Claims, 3 Drawing Sheets

MULTI-STAGE MEMBRANE SYSTEMS WITH POLYMERIC AND MICROPOROUS ZEOLITIC INORGANIC MEMBRANES FOR GAS SEPARATIONS

BACKGROUND OF THE INVENTION

In the past 30-35 years, the state of the art of polymeric membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications of membrane gas separation have achieved commercial success, including nitrogen enrichment from air, carbon dioxide removal from natural gas and from enhanced oil recovery, and also in hydrogen removal from nitrogen, methane, and argon in ammonia purge gas streams.

Polymers provide a range of properties including low cost, permeability, mechanical stability, and ease of processability that are important for gas separations. Glassy polymers (i.e., polymers at temperatures below their Tg) have stiffer polymer backbones and therefore let smaller molecules such as hydrogen and helium pass through more quickly, while larger molecules such as hydrocarbons pass through more slowly as compared to polymers with less stiff backbones. The membranes most commonly used in commercial gas and liquid separation applications are polymeric membranes and have a thin nonporous selective skin layer that performs the separation. The separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as permeability or $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas.

One of the components to be separated by a membrane must have a sufficiently high permeance at the preferred conditions or extraordinarily large membrane surface areas is required to allow separation of large amounts of material. Permeance, measured in Gas Permeation Units (GPU, 1 GPU=$10^{-6}$ cm$^3$ (STP)/cm$^2$ s (cm Hg)), is the pressure normalized flux and equals to permeability divided by the skin layer thickness of the membrane. For gas separation applications, both high permeability and selectivity are desirable because higher permeability decreases the size of the membrane area required to treat a given volume of gas, thereby decreasing capital cost of membrane units, and because higher selectivity results in a higher purity product gas.

In order to combine high selectivity and high permeability together with high thermal stability, new high-performance polymers such as polyimides (PIs), poly(trimethylsilylpropyne) (PTMSP), and polytriazole were developed. These new polymeric membrane materials have shown promising properties for separation of gas pairs like $CO_2/CH_4$, $O_2/N_2$, $H_2/CH_4$, and $C_3H_6/C_3H_8$. However, current polymeric membrane materials have reached a limit in their productivity-selectivity trade-off relationship. In addition, gas separation processes based on glassy polymer membranes frequently suffer from plasticization of the stiff polymer matrix by the sorbed penetrating molecules such as $CO_2$ or $C_3H_6$. Plasticization of the polymer is exhibited by swelling of the membrane structure and by a significant increase in the permeances of all components in the feed and decrease of selectivity occurring above the plasticization pressure when the feed gas mixture contains condensable gases. Plasticization is particularly an issue for gas fields containing high $CO_2$ concentrations and heavy hydrocarbons and for systems requiring multistage membranes. Membrane system designs can be single stage or multistage. The performance of a single stage system will be limited by the intrinsic properties of the membrane used. Multistage membrane systems allow increasing the product recovery or the product purity beyond what a one stage system would offer. Multistage membranes are comprised of multiple membrane modules and typically include additional compression. In a typical two stage membrane system, the first stage permeate is recompressed and fed to the second stage. The residue from the second stage can be delivered as product or recycled back to the first stage. In either of these arrangements the first stage permeate will normally have a high $CO_2$ concentration. This high $CO_2$ concentration can lead to plasticization of the polymeric membranes in the second stage, resulting in lower selectivity that would lead to lower hydrocarbon recovery and/or higher compression cost due to higher recycle rates.

Multistage membrane systems can significantly increase the product recovery or the product purity compared to a one-stage membrane system. However, new multistage membrane systems with reduced compressor cost and with no $CO_2$ plasticization issue are still needed.

SUMMARY OF THE INVENTION

The present invention discloses a multistage membrane system comprising a polymeric membrane as the first stage membrane and a microporous zeolitic inorganic membrane or a combination of a microporous zeolitic inorganic membrane and a polymeric membrane as the second stage membrane. The present invention also discloses the use of such a multistage membrane system for gas separations, particularly for acid gases removal from natural gas.

The present invention discloses the use of a low cost, high pressure resistant, and high permeance polymeric membrane as the first stage membrane and the use of a relatively high cost, high plasticization resistant, high permeance, and high selectivity microporous zeolitic inorganic membrane as the second stage membrane or the use of a combination of a high cost, high plasticization resistant, high permeance, and high selectivity microporous zeolitic inorganic membrane and a low cost, high pressure resistant, and high permeance polymeric membrane as the second stage membrane. The combination of the two types of membranes in the specified arrangement in the present invention allows further increasing product recovery and product purity, extending element life in the second stage, and reducing interstage compression costs when compared to the prior art, while keeping membrane system size small.

The polymeric membranes employed have low cost, easy processability, high permeance, good selectivity, and high pressure resistance. The microporous zeolitic inorganic membranes employed in the present invention have high cost, high permeance, high selectivity, high thermal stability, high resistance to plasticization by condensable gases.

Prior art gas separation membrane systems utilize high pressure resistant and high permeance polymeric membranes in all stages. In systems with high condensable gas content, plasticization by condensable gases in the second stage polymeric membrane results in lower selectivity in the second stage, shorter membrane life, lower product recovery and higher recycle rates. The present invention provides lower cost by reducing compression costs and/or increasing element life in the second stage. It also provides higher performance in the form of higher product recovery and/or product purity.

DETAILED DESCRIPTION OF THE INVENTION

Membranes are becoming increasingly important components for sustainable growth of process industries throughout the world. As a process step replacing conventional energy-intensive unit operations such as thermal distillation, membranes are often-considered components in process intensification studies and implementations. Membrane systems can also enable separations that are otherwise unfeasible, such as efficient acid gas removal from natural gas on shipborne natural gas platforms, or floating production, storage and offloading (FPSO) vessels.

Polymeric membranes have been used successfully in commercial gas separation systems such as $N_2$ enrichment from air, acid gases including $CO_2$ and $H_2S$ removal from natural gas and from enhanced oil recovery, and also in hydrogen removal from nitrogen, methane, and argon in ammonia purge gas streams. Microporous zeolitic inorganic membranes comprising a selective layer composed mostly of microporous aluminosilicate, silicate zeolite, silicoaluminophosphate (SAPO), metalloaluminophosphate (MeAPO), metallosilicoaluminophosphate (MeAPSO), metal-organic framework (MOF), zeolitic imidazolate framework (ZIF), covalent organic framework (COF), or other crystalline compositions have been studied for separations and catalytic reactions for at least 25 years. However, implementing today's best zeolitic inorganic membranes for commercial gas separation applications is still not successful with the high cost as a major challenge.

The present invention discloses a multistage membrane system comprising a polymeric membrane as the first stage membrane and a microporous zeolitic inorganic membrane or a combination of a microporous zeolitic inorganic membrane and a polymeric membrane as the second stage membrane. In the present invention, a low cost, high pressure resistant, and high permeance polymeric membrane is used as the first stage membrane and a relatively high cost, high plasticization resistant, high permeance, and high selectivity microporous zeolitic inorganic membrane or a combination of a high cost, high plasticization resistant, high permeance, and high selectivity microporous zeolitic inorganic membrane and a low cost, high pressure resistant, and high permeance polymeric membrane is used as the second stage membrane. The combination of the two types of membranes in the specified arrangement in the present invention allows further increasing product recovery and product purity, extending element life in the second stage, and reducing interstage compression costs when compared to the prior art, while keeping membrane system size small.

Prior art gas separation membrane systems utilize high pressure resistant and high permeance polymeric membranes in all stages. In systems with high condensable gas content, plasticization by condensable gases in the second stage polymeric membrane results in lower selectivity in the second stage, shorter membrane life, lower product recovery and higher recycle rates. The present invention provides lower cost by reducing compression costs and/or increasing element life in the second stage. It also provides higher performance in the form of higher product recovery and/or product purity.

The polymeric membranes employed in the current invention have low cost, easy processability, high permeance, good selectivity, and high pressure resistance. The microporous zeolitic inorganic membranes employed in the present invention have high cost, high permeance, high selectivity, high thermal stability, high resistance to plasticization by condensable gases.

It is preferred that the low cost, high pressure resistant, and high permeance polymeric membrane used in the first stage or in both the first stage and part of the second stage in the present invention is fabricated from a glassy polymer with a high glass transition temperature (Tg). It is also preferred that the low cost, high pressure resistant, and high permeance polymeric membrane used in the first stage or in both the first stage and part of the second stage in the present invention exhibits a desired product component selectivity of at least 8, more preferably at least 10 at the operating conditions. The low cost, high pressure resistant, and high permeance polymeric membrane used in the first stage and the low cost, high pressure resistant, and high permeance polymeric membrane used in part of the second stage in the present invention can be the same membrane or different membranes.

The polymer used for the preparation of the low cost, high pressure resistant, and high permeance polymeric membrane used as the first stage membrane or both the first stage and part of the second stage membranes in the present invention can be selected from, but is not limited to, polysulfones, polyethersulfones, sulfonated polysulfones, sulfonated polyether sulfones, polyetherimides, cellulosic polymers, such as cellulose acetate and cellulose triacetate, polyimides, polyamide/imides, polyketones, polyether ketones, poly (arylene oxides) such as poly(phenylene oxide) and poly (xylene oxide), poly(benzobenzimidazole), polyhydrazides, polyoxadiazoles, polybenzoxazoles, polytriazoles, poly (benzimidazole), polycarbodiimides, polyphosphazines, microporous polymers, or a mixture thereof. Preferably, the polymer used for the preparation of the low cost, high pressure resistant, and high permeance polymeric membrane used as the first stage membrane or both the first stage and part of the second stage membranes in the present invention is selected from polysulfones, polyethersulfones, cellulosic polymers, such as cellulose acetate and cellulose triacetate, polyimides, polyamide/imides, polyetherimides, or a mixture thereof.

The low cost, high pressure resistant, and high permeance polymeric membrane used as the first stage membrane or both the first stage and part of the second stage membranes in the present invention can be fabricated into any convenient form such as sheet, disk, tube, spiral wound, or hollow fiber. These polymeric membranes can also be fabricated into thin film composite membranes incorporating a selective thin polymer layer and a porous supporting layer comprising a different polymer material or an inorganic material.

Preferably, the high cost, high plasticization resistant, high permeance, and high selectivity microporous zeolitic inorganic membrane comprising a selective layer composed mostly of microporous zeolitic inorganic material used as the second stage membrane or the succeeding stage membranes in the multistage membrane system of the present invention is fabricated from microporous aluminosilicate, silicate zeolite, silicoaluminophosphate (SAPO), metalloaluminophosphate (MeAPO), metallosilicoaluminophosphate (MeAPSO), metal-organic framework (MOF), zeolitic imidazolate framework (ZIF), covalent organic framework (COF), or a mixture thereof. It is also preferred that the microporous zeolitic inorganic membrane in the present invention exhibits a desired high product component selectivity of at least 25, more preferably at least 30 at the operating conditions. More preferably, the high cost, high plasticization resistant, high permeance, and high selectivity microporous zeolitic inorganic membrane comprising a selective layer composed mostly of microporous zeolitic inorganic material used as the second stage membrane or the succeeding stage membranes in the multistage membrane system of the present invention is fabricated from small pore microporous aluminosilicate, silicate zeolite, silicoaluminophosphate (SAPO), metalloaluminophosphate (MeAPO), metallosilicoaluminophosphate (MeAPSO), metal-organic framework (MOF), zeolitic imidazolate framework (ZIF), covalent organic framework (COF), or a mixture thereof with a micropore size of 4.5 Å or less. Some examples of the small pore microporous zeolitic inorganic membranes used in the second stage of the multistage membrane systems in the present invention include AlPO-14, AlPO-18, AlPO-34, SAPO-34, SSZ-13, DD3R, ITQ-12, CDS-1, UZM-25, MOF-5, ZIF-8, ZIF-67, and a mixture thereof.

The microporous zeolitic inorganic membrane used as the second stage membrane or the succeeding stage membranes in the multistage membrane system in the present invention can be fabricated into any convenient form such as disk, tube, multi-channel tube, or monolith tube. These microporous zeolitic inorganic membranes with high plasticization resistant and high selectivity comprise a selective thin microporous zeolitic inorganic layer and a porous supporting layer comprising a different inorganic material such as stainless steel material, metal oxide material, or ceramic material.

The present invention involves a process for separating a mixture of gases or vapors using a multistage membrane system comprising sending said mixture of gases or vapors to a first stage polymeric membrane unit to separate them into a first permeate stream passing through the membrane within said first stage membrane unit and a first retentate stream that does not pass through said first stage membrane unit; sending said first permeate stream to a second stage membrane unit to separate said first permeate stream into a second permeate stream and a second retentate stream wherein the second stage membrane unit comprises a microporous zeolitic inorganic membrane alone or a combination of a microporous zeolitic inorganic membrane and a polymeric membrane.

The present invention discloses a number of multistage membrane systems (as shown in FIGS. 1-6) to improve product recovery and product purity, extending element life in the second stage, and reducing interstage compression costs when compared to the prior art, while keeping membrane system size small.

Figure 1:
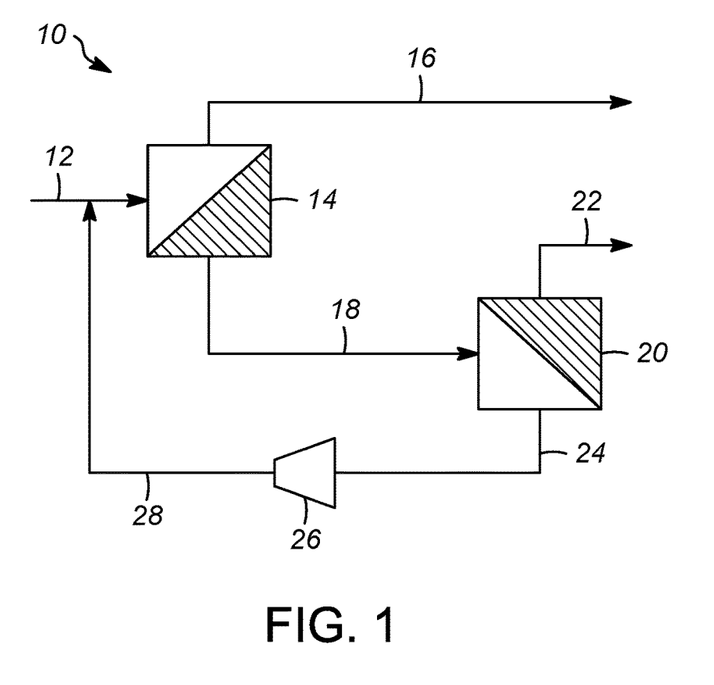
FIG. 1 shows a multistage membrane system without an interstage compressor but with a second stage residue compressor and second stage residue recycled back to a first stage feed.

In FIG. 1 is shown a multistage membrane system 10 in which the first stage low cost, high pressure resistant, and high permeance polymeric membranes will have a high permeate pressure of at least 50 psig. A feed 12 is sent to a first stage membrane unit 14 to produce a residue (product stream) 16 and a first stage permeate 18 that is not compressed and is sent directly to a second stage high plasticization resistant and high selectivity microporous zeolitic inorganic membrane unit 20 to produce a permeate 22 and a residue 24 from the second stage membrane unit that will then be compressed by compressor 26 to the feed pressure and then stream 28 is recycled back to feed 12 for the first stage membrane unit. Permeate 22 is waste and can either be reinjected into deep underground or deep under the sea bed to recover additional product, flared or used as fuel gas. The second stage membrane unit can be comprised of the zeolitic inorganic membrane alone or a combination of the zeolitic inorganic membrane and the polymeric membrane. The polymeric membrane in the first stage and the polymeric membrane in the second stage can be the same membrane or different membranes.

Figure 2:
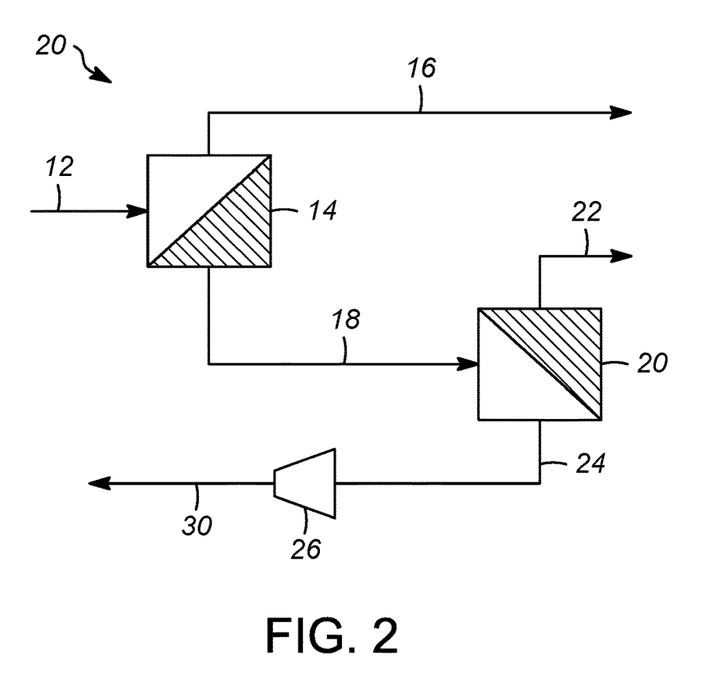
FIG. 2 shows a multistage membrane system without interstage compressor, but with a second stage residue compressor and second stage residue delivered as product.

In FIG. 2, a multistage membrane system 20 is shown without an interstage compressor but with a second stage residue compressor and a second stage residue delivered as the product. The first stage low cost, high pressure resistant, and high permeance polymeric membranes will have a high permeate pressure of at least 50 psig. The feed 12 is sent to a first stage membrane unit 14 with a residue stream 16 being the product stream. The permeate stream 18 from the first stage membrane unit is not compressed and is sent directly to the second stage high plasticization resistant and high selectivity microporous zeolitic inorganic membrane unit 20. The residue 24 from the second stage membrane unit will then be compressed to product pressure by compressor 26 and is also delivered as a second product stream 30. Permeate 22 is waste and can either be reinjected into deep underground or deep under the sea bed, flared or used as fuel gas. The second stage membrane unit can be comprised of the zeolitic inorganic membrane alone or a combination of the zeolitic inorganic membrane and the polymeric membrane. The polymeric membrane in the first stage membrane unit and the polymeric membrane in the second stage membrane unit can be the same membrane or different membranes.

Figure 3:
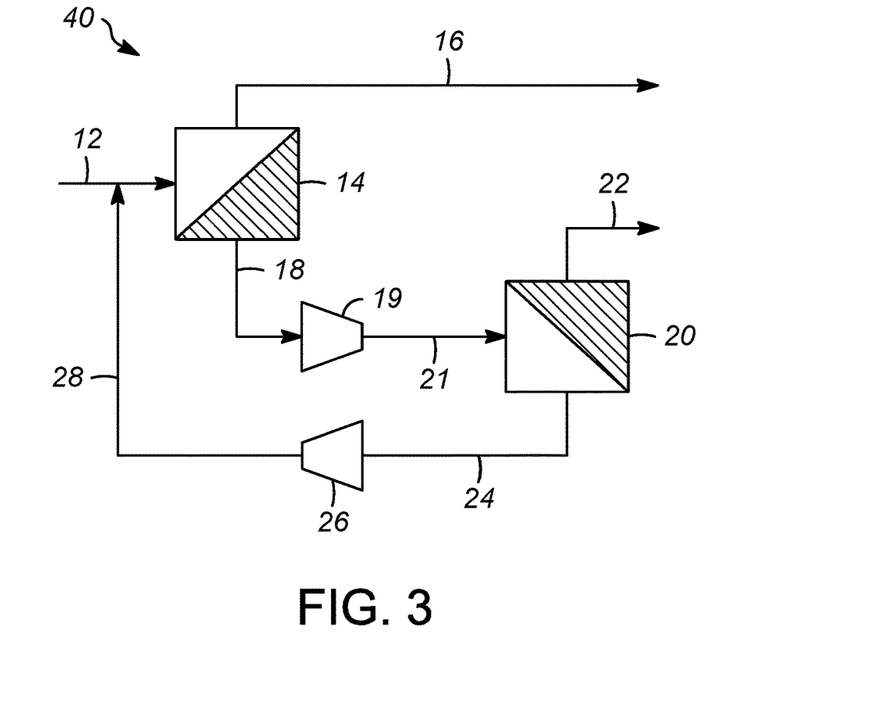
FIG. 3 shows a multistage membrane system with a small interstage compressor, a second stage residue compressor, and second stage residue recycled back to first stage feed.

In FIG. 3 is shown a multistage membrane system 40 with a small interstage compressor, a second stage residue compressor and a second stage residue recycled back to the first stage feed, in which the first stage low cost, high pressure resistant, and high permeance polymeric membranes will have a low permeate pressure of less than 50 psig. Feed 12 is sent to the first stage membrane unit 14 to produce a residue (product stream) 16. The first stage permeate 18 will be compressed to an intermediate pressure between the first stage permeate pressure and the first stage feed pressure, after being compressed by compressor 19 and compressed stream 21 is sent to the second stage high plasticization resistant and high selectivity microporous zeolitic inorganic membrane unit 20. The residue 24 from the second stage will then be compressed in compressor 26 to produce a stream 28 that is at the feed pressure and recycled back to feed 12 for the first stage. Permeate 22 is waste and can either be reinjected into deep underground or deep under the sea bed, flared or used as fuel gas. The second stage can be comprised of the zeolitic inorganic membrane alone or a combination of the zeolitic inorganic membrane and the polymeric membrane. The polymeric membrane in the first stage and the polymeric membrane in the second stage can be the same membrane or different membranes.

Figure 4:
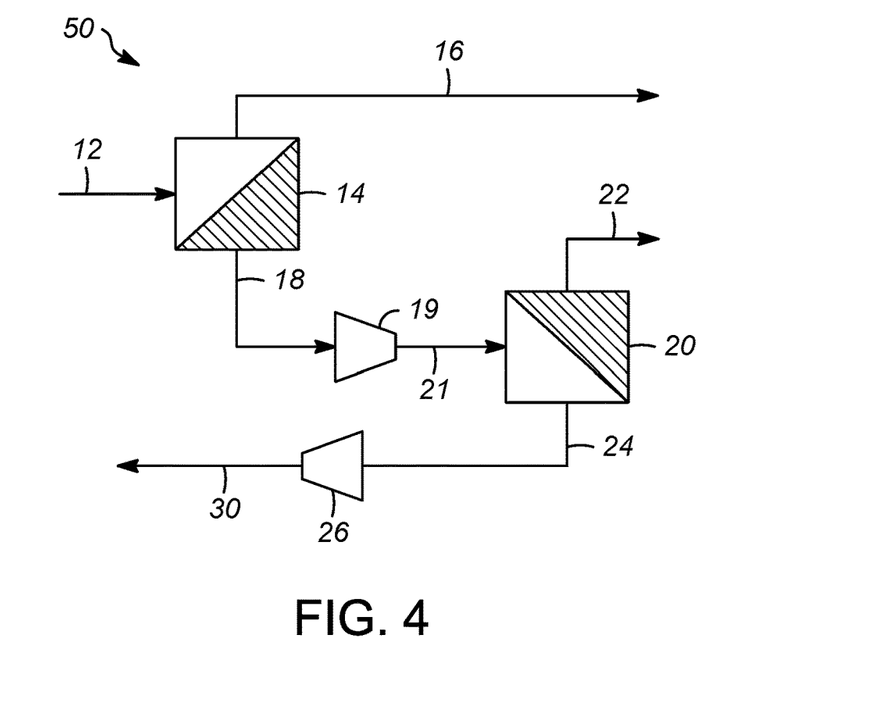
FIG. 4 shows a multistage membrane system with a small interstage compressor, a second stage residue compressor, and second stage residue delivered as product.

In FIG. 4 is shown a multistage membrane system 50 with a small interstage compressor, a second stage residue compressor and a second stage residue delivered as the product. The first stage low cost, high pressure resistant, and high permeance polymeric membranes will have a low permeate pressure of less than 50 psig. Feed 12 is sent to the first stage membrane unit 14 to produce a residue (product stream) 16. The first stage permeate 18 will be compressed to an intermediate pressure between the first stage permeate pressure and the first stage feed pressure, after being compressed by compressor 19 and compressed stream 21 is sent to the second stage high plasticization resistant and high selectivity microporous zeolitic inorganic membrane unit 20. Permeate 22 is waste and can either be reinjected into deep underground or deep under the sea bed, flared or used as fuel gas. The residue 24 from the second stage will then be compressed in compressor 26 to produce a compressed residue 30 that is also a product stream. The second stage can be comprised of the zeolitic inorganic membrane alone or a combination of the zeolitic inorganic membrane and the polymeric membrane. The polymeric membrane in the first stage and the polymeric membrane in the second stage can be the same membrane or different membranes.

Figure 5:
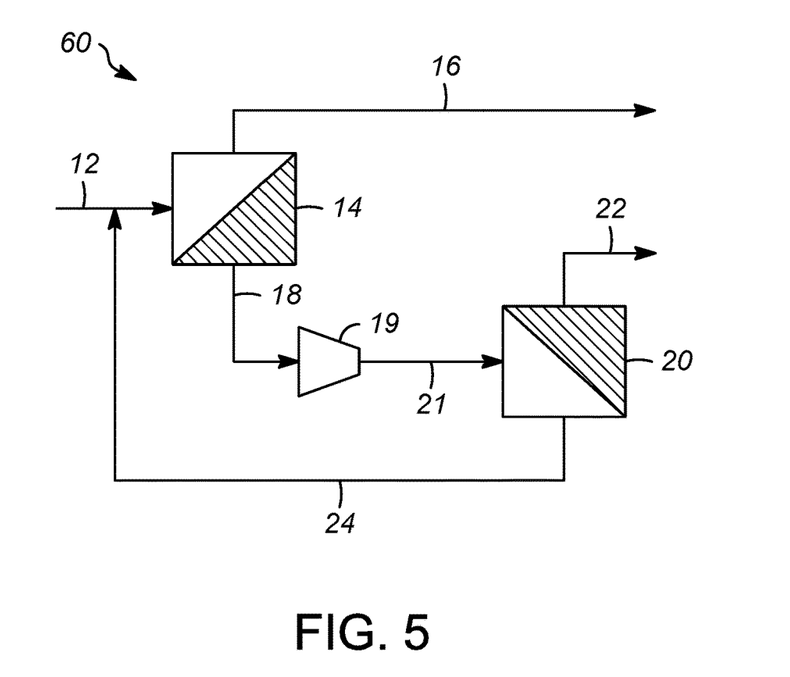
FIG. 5 shows a multistage membrane system with an interstage compressor and second stage high pressure residue directly recycled back to first stage feed.

In FIG. 5 is shown a multistage membrane system 60 with an interstage compressor and a second stage high pressure residue directly recycled back to the first stage feed. The first stage low cost, high pressure resistant, and high permeance polymeric membranes will have a low permeate pressure of less than 50 psig. Feed 12 is sent to the first stage membrane unit 14 to produce a residue (product stream) 16. The first stage permeate 18 will be compressed to an intermediate pressure between the first stage permeate pressure and the first stage feed pressure, after being compressed by compressor 19 and compressed stream 21 is sent to the second stage high plasticization resistant and high selectivity microporous zeolitic inorganic membrane unit 20. The residue 24 from the second stage is recycled back to feed 12 for the first stage. Permeate 22 is waste and can either be reinjected into deep underground or deep under the sea bed, flared or used as fuel gas. The second stage can be comprised of the zeolitic inorganic membrane alone or a combination of the zeolitic inorganic membrane and the polymeric membrane. The polymeric membrane in the first stage and the polymeric membrane in the second stage can be the same membrane or different membranes.

Figure 6:
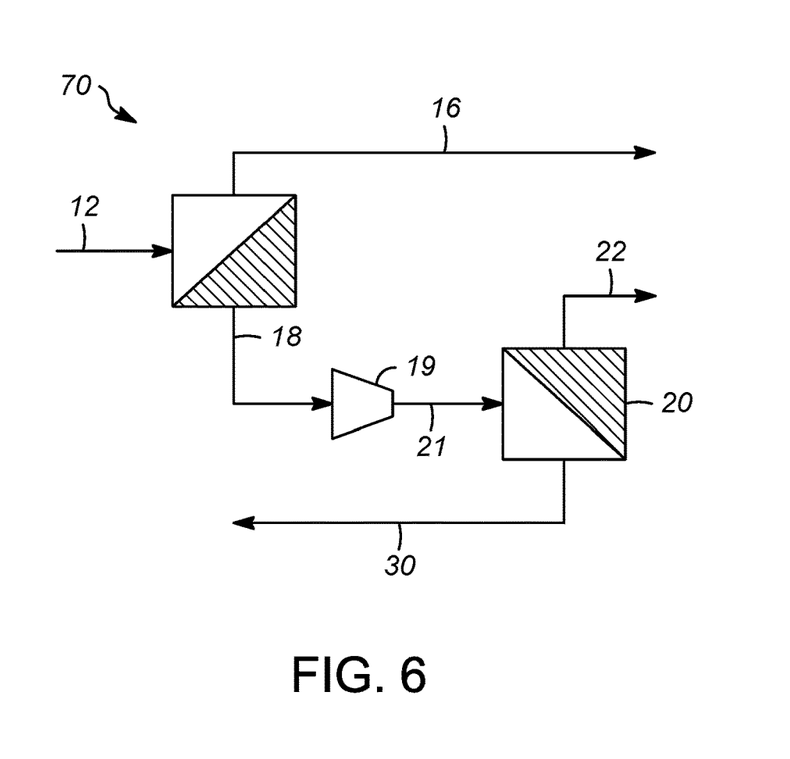
FIG. 6 shows a multistage membrane system with an interstage compressor and second stage residue delivered as product.

In FIG. 6, a multistage membrane system 70 has an interstage compressor between the membrane units and a second stage residue delivered as the product. The first stage low cost, high pressure resistant, and high permeance polymeric membranes will have a low permeate pressure of less than 50 psig. Feed 12 is sent to the first stage membrane unit 14 to produce a residue (product) stream 16. The first stage permeate 18 will be compressed to an intermediate pressure between the first stage permeate pressure and the first stage feed pressure, after being compressed by compressor 19 and compressed stream 21 is sent to the second stage high plasticization resistant and high selectivity microporous zeolitic inorganic membrane unit 20. The residue 30 is also a product stream. Permeate 22 is waste and can either be reinjected into deep underground or deep under the sea bed, flared or used as fuel gas. The second stage can be comprised of the zeolitic inorganic membrane alone or a combination of the zeolitic inorganic membrane and the polymeric membrane. The polymeric membrane in the first stage and the polymeric membrane in the second stage can be the same membrane or different membranes.

The multistage membrane system comprising a polymeric membrane as the first stage membrane and a microporous zeolitic inorganic membrane or a combination of a microporous zeolitic inorganic membrane and a polymeric membrane as the second stage membrane disclosed in the present invention reduces inter-stage compression costs, increases product recovery and product purity for gas and vapor separations particularly for acid gases removal from natural gas as compared to prior art multistage membrane system comprising polymeric membranes for all the stages. The multistage membrane system comprising a polymeric membrane as the first stage membrane and a microporous zeolitic inorganic membrane or a combination of a microporous zeolitic inorganic membrane and a polymeric membrane as the second stage membrane disclosed in the present invention also shows significantly lower CAPEX and OPEX than a multistage membrane system comprising high cost, microporous zeolitic inorganic membranes for all the stages.

The multistage membrane system comprising a polymeric membrane as the first stage membrane and a microporous zeolitic inorganic membrane or a combination of a microporous zeolitic inorganic membrane and a polymeric membrane as the second stage membrane disclosed in the present invention can be used for a variety of gas and vapor separation applications such as $CO_2/CH_4$, $H_2S/CH_4$, $N_2/CH_4$, $H_2/CH_4$, and $He/CH_4$ separations, the separation of $CO_2$ or/and $H_2S$ from natural gas, separation of $N_2$, $CO_2$ or/and $H_2S$ from natural gas, $H_2$ from $N_2$, $CH_4$, and Ar in ammonia purge gas streams, $H_2$ recovery in refineries, $CO_2$ removal and olefin recovery from ethylene oxide or ethylene glycol plants, olefin/paraffin separations such as propylene/propane separation, liquid natural gas separations, $C_{2+}$ hydrocarbon recovery.

The multistage membrane system comprising a polymeric membrane as the first stage membrane and a microporous zeolitic inorganic membrane or a combination of a microporous zeolitic inorganic membrane and a polymeric membrane as the second stage membrane disclosed in the present invention is particularly useful for natural gas upgrading from natural gas streams comprising high $CO_2$ concentration of at least 30 mol % or/and high $H_2S$ concentration of at least 30 mol %.

Any of the above conduits, unit devices, scaffolding, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

EXAMPLES

The following examples are provided to illustrate one or more preferred embodiments of the invention, but are not limited embodiments thereof. Numerous variations can be made to the following examples that lie within the scope of the invention.

Comparative Example 1

A Two-Stage Membrane System Comprising a Polymeric Membrane P-A in First Stage and a Polymeric Membrane P-B in Second Stage, and an Inter-Stage Compressor As shown in FIG. 5, a two-stage membrane system comprising a low cost (approximately $5/ft$^2$) polymeric membrane P-A with $CO_2$ permeance of 180 GPU and $CO_2/CH_4$ selectivity of 14 at 60° C. under 985 psig as the first stage membrane and a polymeric membrane P-B with higher cost (approximately $15/ft$^2$), $CO_2$ permeance of 180 GPU and $CO_2/CH_4$ selectivity of 12.5 at 44° C. under 1020 psig as the second stage membrane for $CO_2$ removal from natural gas comprising approximately 30 mol % $CO_2$/approximately 70 mol % $CH_4$. For this two-stage membrane system, an interstage compressor was used to pressurize the first stage permeate from below 50 psig to 1020 psig and the pressurized first stage permeate was fed to the second stage membrane. The high pressure second stage residue was directly recycled back to first stage feed. This two-stage polymeric membrane system provided a $CH_4$ recovery of 95.8%.

Example 1

A Two-Stage Membrane System Comprising a Polymeric Membrane P-A in First Stage, a Small Pore Microporous Zeolitic Membrane Z-A in Second Stage, and an Inter-Stage Compressor As shown in FIG. 5, a two-stage membrane system comprising a low cost (approximately $5/ft$^2$) polymeric membrane P-A with $CO_2$ permeance of 180 GPU and $CO_2/CH_4$ selectivity of 14 at 60° C. under 985 psig as the first stage membrane and a small pore microporous zeolitic membrane Z-A with high cost (approximately $300/ft$^2$), $CO_2$ permeance of 470 GPU and $CO_2/CH_4$ selectivity of 42 at 44° C. under 1020 psig as the second stage membrane for $CO_2$ removal from natural gas comprising approximately 30 mol % $CO_2$/approximately 70 mol % $CH_4$. For this two-stage membrane system, an interstage compressor was used to pressurize the first stage permeate from below 50 psig to 1020 psig and the pressurized first stage permeate was fed to the second stage membrane. The high pressure second stage residue was directly recycled back to first stage feed. This two-stage membrane system provided a high $CH_4$ recovery of 98.8%, which is much higher than that from the two-stage membrane system comprising polymeric membranes for both stages as shown in Comparative Example 1.

Example 2

A Two-Stage Membrane System Comprising a Polymeric Membrane P-A in First Stage and a Small Pore Microporous Zeolitic Membrane Z-A in Second Stage, a Small Inter-Stage Compressor, and a Second Stage Residue Compressor As shown in FIG. 3, a two-stage membrane system comprising a low cost (approximately $5/ft$^2$) polymeric membrane P-A with $CO_2$ permeance of 180 GPU and $CO_2/CH_4$ selectivity of 14 at 60° C. under 985 psig as the first stage membrane and a small pore microporous zeolitic membrane Z-A with high cost (approximately $300/ft$^2$), $CO_2$ permeance of 1915 GPU and $CO_2/CH_4$ selectivity of 250 at 44° C. under 100 psig as the second stage membrane for $CO_2$ removal from natural gas comprising approximately 30 mol % $CO_2$/approximately 70 mol % $CH_4$. For this two-stage membrane system, a small interstage compressor was used to pressurize the first stage permeate from below 50 psig to 100 psig and the pressurized first stage permeate was fed to the second stage membrane. A second stage residue compressor was used to pressurize the second stage residue to 985 psig and the pressurized second stage residue was recycled back to first stage feed. This two-stage membrane system provided a high $CH_4$ recovery of 99.6%, which is significantly higher than that from the two-stage membrane system comprising polymeric membranes for both stages as shown in Comparative Example 1.

Example 3

A Two-Stage Membrane System Comprising a Polymeric Membrane P-A in First Stage and a Combination of a Small Pore Microporous Zeolitic Membrane Z-A and a Polymeric Membrane P-A in Second Stage, a Small Inter-Stage Compressor, and a Second Stage Residue Compressor As shown in FIG. 3, a two-stage membrane system comprising a low cost (approximately $5/ft$^2$) polymeric membrane P-A with $CO_2$ permeance of 180 GPU and $CO_2/CH_4$ selectivity of 14 at 60° C. under 985 psig as the first stage membrane and a combination of a small pore microporous zeolitic membrane Z-A with high cost (approximately $500/ft$^2$), $CO_2$ permeance of 2240 GPU and $CO_2/CH_4$ selectivity of 260 at 44° C. under 100 psig and the polymeric membrane P-A as the second stage membranes for $CO_2$ removal from natural gas comprising approximately 30 mol % $CO_2$/approximately 70 mol % $CH_4$. For this two-stage membrane system, a small interstage compressor was used to pressurize the first stage permeate from below 50 psig to 100 psig and the pressurized first stage permeate was fed to the second stage membrane. A second stage residue compressor was used to pressurize the second stage residue to 985 psig and the pressurized second stage residue was recycled back to first stage feed. This two-stage membrane system provided a very high $CH_4$ recovery of 99.8%, which is significantly higher than that from the two-stage membrane system comprising polymeric membranes for both stages as shown in Comparative Example 1.

Specific Embodiments

While the following is described in conjunction with specific embodiments, it will be understood that this description is intended to illustrate and not limit the scope of the preceding description and the appended claims.

A first embodiment of the invention is a multistage membrane system comprising at least two membrane units wherein first stage membrane unit comprises a polymeric membrane and a second membrane unit comprises a microporous zeolitic inorganic membrane or a combination of a microporous zeolitic inorganic membrane and a polymeric membrane. An embodiment of the invention is one, any or all of prior embodiments in this paragraph up through the first embodiment in this paragraph wherein the polymeric membrane is selected from the group consisting of polysulfones, polyethersulfones, sulfonated polysulfones, sulfonated polyether sulfones, polyetherimides, cellulosic polymers, polyimides, polyamide/imides, polyketones, polyether ketones, poly(arylene oxides), poly(benzobenzimidazole), polyhydrazides, polyoxadiazoles, polybenzoxazoles, polytriazoles, poly(benzimidazole), polycarbodiimides, polyphosphazines, microporous polymers, and mixtures thereof. An embodiment of the invention is one, any or all of prior embodiments in this paragraph up through the first embodiment in this paragraph wherein the microporous zeolitic inorganic membrane comprises a selective layer mostly of a microporous aluminosilicate, a silicate zeolite, a silicoaluminophosphate (SAPO), a metalloaluminophosphate (MeAPO), a metallosilicoaluminophosphate (MeAPSO), a metal-organic framework (MOF), a zeolitic imidazolate framework (ZIF), or a covalent organic framework (COF). An embodiment of the invention is one, any or all of prior embodiments in this paragraph up through the first embodiment in this paragraph wherein both the first stage membrane unit and the second stage membrane unit comprise the same polymeric membrane or a different polymeric membrane. An embodiment of the invention is one, any or all of prior embodiments in this paragraph up through the first embodiment in this paragraph wherein the microporous zeolitic inorganic membrane comprises a structure selected from the group consisting of AlPO-14, AlPO-18, AlPO-34, SAPO-34, SSZ-13, DD3R, ITQ-12, CDS-1, UZM-25, MOF-5, ZIF-8, ZIF-67, and mixtures thereof.

A second embodiment of the invention is a process for treating a gas stream comprising sending the gas stream through a multistage membrane system comprising at least two membrane units wherein a first stage membrane unit comprises a polymeric membrane and a second membrane unit comprises a microporous zeolitic inorganic membrane or a combination of a microporous zeolitic inorganic membrane and a polymeric membrane and wherein the gas stream first contacts the first stage membrane unit to separate the gas stream into a first permeate stream and a first residue stream; sending the first residue stream to a product stream; and sending the first permeate stream to the second membrane unit to be separated into a second permeate stream and a second residue stream. An embodiment of the invention is one, any or all of prior embodiments in this paragraph up through the first embodiment in this paragraph wherein the second permeate stream is a waste stream. An embodiment of the invention is one, any or all of prior embodiments in this paragraph up through the first embodiment in this paragraph wherein the second residue stream is compressed and recycled to the gas stream. An embodiment of the invention is one, any or all of prior embodiments in this paragraph up through the first embodiment in this paragraph wherein the second residue stream is sent to a product stream. An embodiment of the invention is one, any or all of prior embodiments in this paragraph up through the first embodiment in this paragraph wherein the second residue stream is compressed and then sent to the product stream. An embodiment of the invention is one, any or all of prior embodiments in this paragraph up through the first embodiment in this paragraph wherein the first permeate stream is compressed and then sent to the second membrane unit. An embodiment of the invention is one, any or all of prior embodiments in this paragraph up through the first embodiment in this paragraph wherein the polymeric membrane is selected from the group consisting of polysulfones, polyethersulfones, sulfonated polysulfones, sulfonated polyether sulfones, polyetherimides, cellulosic polymers, polyimides, polyamide/imides, polyketones, polyether ketones, poly(arylene oxides), poly(benzobenzimidazole), polyhydrazides, polyoxadiazoles, polybenzoxazoles, polytriazoles, poly(benzimidazole), polycarbodiimides, polyphosphazines, microporous polymers, and mixtures thereof. An embodiment of the invention is one, any or all of prior embodiments in this paragraph up through the first embodiment in this paragraph wherein the microporous zeolitic inorganic membrane comprises a selective layer mostly of a microporous aluminosilicate, a silicate zeolite, a silicoaluminophosphate (SAPO), a metalloaluminophosphate (MeAPO), a metallosilicoaluminophosphate (MeAPSO), a metal-organic framework (MOF), a zeolitic imidazolate framework (ZIF), or a covalent organic framework (COF). An embodiment of the invention is one, any or all of prior embodiments in this paragraph up through the first embodiment in this paragraph wherein both the first stage membrane unit and the second stage membrane unit comprise the same polymeric membrane or a different polymeric membrane. An embodiment of the invention is one, any or all of prior embodiments in this paragraph up through the first embodiment in this paragraph wherein the microporous zeolitic inorganic membrane comprises a structure selected from the group consisting of AlPO-14, AlPO-18, AlPO-34, SAPO-34, SSZ-13, DD3R, ITQ-12, CDS-1, UZM-25, MOF-5, ZIF-8, ZIF-67, and mixtures thereof. An embodiment of the invention is one, any or all of prior embodiments in this paragraph up through the first embodiment in this paragraph wherein the gas stream is natural gas. An embodiment of the invention is one, any or all of prior embodiments in this paragraph up through the first embodiment in this paragraph wherein the gas stream is a pair of gases selected from the group consisting of $CO_2/CH_4$, $H_2S/CH_4$, $N_2/CH_4$, $H_2/CH_4$, and $He/CH_4$. An embodiment of the invention is one, any or all of prior embodiments in this paragraph up through the first embodiment in this paragraph wherein the gas stream is selected from the group consisting of $H_2$ from $N_2$, $CH_4$, and Ar in ammonia purge gas streams, $H_2$ recovery in refineries, $CO_2$ removal and olefin recovery from ethylene oxide or ethylene glycol plants, olefin/paraffin separations, liquid natural gas separations, and $C_{2+}$ hydrocarbon recovery. An embodiment of the invention is one, any or all of prior embodiments in this paragraph up through the first embodiment in this paragraph further comprising at least one of sensing at least one parameter of the process and generating a signal from the sensing; sensing at least one parameter of the process and generating data from the sensing; generating and transmitting a signal; generating and transmitting data.

The invention claimed is:

1. A process for treating a gas stream comprising:
   sending said gas stream through a two-stage membrane system having two membrane units wherein a first membrane unit comprises a polymeric membrane and a second membrane unit comprises a micoporous zeolitic inorganic membrane or a combination of a micoporous zeolitic inorganic membrane and a polymeric membrane, wherein said gas stream first contacts said first membrane unit to separate said gas stream into a first permeate stream and a first residue stream;
   sending said first residue stream to a product stream;
   compressing the first permeate stream in an interstage compressor to pressurize the first permeate stream to about 100 psig;
   sending said compressed first permeate stream to said second membrane unit to be separated into a second permeate stream and a second residue stream; and
   compressing the second residue stream in a second stage residue compressor to pressurize said second residue stream.

2. The process of claim 1 wherein said second permeate stream is a waste stream.

3. The process of claim 1 wherein said second residue stream is recycled to said gas stream post compression in said second stage residue compressor.

4. The process of claim 1 wherein said compressed second residue stream is sent to said product stream.

5. The process of claim 1 wherein the polymeric membrane is selected from the group consisting of polysulfones, polyethersulfones, sulfonated polysulfones, sulfonated polyether sulfones, polyetherimides, cellulosic polymers, polyimides, polyamide/imides, polyketones, polyether ketones, poly(arylene oxides), poly(benzobenzimidazole), polyhydrazides, polyoxadiazoles, polybenzoxazoles, polytriazoles, poly(benzimidazole), polycarbodiimides, polyphosphazines, microporous polymers, and mixtures thereof.

6. The process of claim 1 wherein the micoporous zeolitic inorganic membrane comprises a selective layer of a microporous aluminosilicate, a silicate zeolite, a silicoaluminophosphate (SAPO), a metalloaluminophosphate (MeAPO), a metallosilicoaluminophosphate (MeAPSO), a metal-organic framework (MOF), a zeolitic imidazolate framework (ZIF), or a covalent organic framework (COF).

7. The process of claim 1 wherein both the first membrane unit and the second membrane unit comprise the same polymeric membrane or a different polymeric membrane.

8. The process of claim 1 wherein the micoporous zeolitic inorganic membrane comprises a structure selected from the group consisting of AlPO-14, AlPO-18, AlPO-34, SAPO-34, SSZ-13, DD3R, ITQ-12, CDS-1, UZM-25, MOF-5, ZIF-8, ZIF-67, and mixtures thereof.

9. The process of claim 1 wherein said gas stream is natural gas.

10. The process of claim 1 wherein said gas stream is a pair of gases selected from the group consisting of $CO_2/CH_4$, $H_2S/CH_4$, $N_2/CH_4$, $H_2/CH_4$, and $He/CH_4$.

11. The process of claim 1 wherein the process is applied in the separation application selected from the group consisting of: (i) $H_2$ from $N_2$, $CH_4$, and Ar in ammonia purge gas streams, (ii) $H_2$ recovery in refineries, (iii) $CO_2$ removal and olefin recovery from ethylene oxide or ethylene glycol plants, (iv) olefin/paraffin separations, (v) liquid natural gas separations, and (vi) $C_2+$ hydrocarbon recovery.

12. The process claim 1, further comprising at least one of:
   sensing at least one parameter of the process and generating a signal from the sensing;
   sensing at least one parameter of the process and generating data from the sensing;
   generating and transmitting a signal; and
   generating and transmitting data.

* * * * *